(12) United States Patent
Eisen et al.

(10) Patent No.: US 9,146,772 B2
(45) Date of Patent: *Sep. 29, 2015

(54) REDUCING POWER GRID NOISE IN A PROCESSOR WHILE MINIMIZING PERFORMANCE LOSS

(71) Applicant: INTERNATIONAL BUSINESS MACHINES CORPORATION, Armonk, NY (US)

(72) Inventors: Lee E. Eisen, Round Rock, TX (US); Michael S. Floyd, Cedar Park, TX (US); Thomas Strach, Wildberg (DE); Huajun Wen, Austin, TX (US); Tingdong Zhou, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/057,984

(22) Filed: Oct. 18, 2013

(65) Prior Publication Data

US 2014/0157277 A1 Jun. 5, 2014

Related U.S. Application Data

(63) Continuation of application No. 13/693,386, filed on Dec. 4, 2012.

(51) Int. Cl.
*G06F 1/26* (2006.01)
*G06F 1/32* (2006.01)
(Continued)

(52) U.S. Cl.
CPC .. *G06F 9/46* (2013.01); *G06F 1/26* (2013.01); *G06F 1/329* (2013.01); *G06F 1/3203* (2013.01);
(Continued)

(58) Field of Classification Search
CPC ... G06F 1/3203; G06F 1/3206; G06F 1/3243; G06F 11/3024; G06F 2201/86
USPC .................. 713/300, 320, 323, 340; 718/102
See application file for complete search history.

(56) References Cited

U.S. PATENT DOCUMENTS 6,636,976 B1 10/2003 Grochowski et al.
6,931,559 B2 8/2005 Burns et al.
(Continued)

OTHER PUBLICATIONS

"Active Noise Regulation", ComLSI, Communication Electronic Systems Integration, accessed online on Nov. 12, 2012 from http://www.comlsi.com/anr2.htm , 8 pages.
(Continued)

*Primary Examiner* — Michael J Brown
(74) *Attorney, Agent, or Firm* — Steven L. Bennett; Amy J. Pattillo

(57) ABSTRACT

In the management of a processor, logical operation activity is monitored for increases from a low level to a high level during a sampling window across multiple cores sharing a common supply rail, with at least one decoupling capacitor along the common supply rail. Responsive to detecting the increase in logical operation activity from the low level to the high level during the sampling window, the processor limits the logical operations executed on the cores during a lower activity period to a level of logical operations set between the low level and a medium level, where the medium level is an amount between the low level and the high level. Responsive to the lower activity period ending, the processor gradually decreases the limit on the logical operations to resume normal operations.

9 Claims, 9 Drawing Sheets

(51) Int. Cl.
  *G06F 9/46* (2006.01)
  *G06F 11/30* (2006.01)

(52) U.S. Cl.
  CPC ............. *G06F 1/3206* (2013.01); *G06F 1/3243* (2013.01); *G06F 11/3024* (2013.01); *G06F 2201/86* (2013.01); *Y02B 60/144* (2013.01)

(56) References Cited

U.S. PATENT DOCUMENTS

| | | | |
|---|---|---|---|
| 7,148,755 | B2 | 12/2006 | Naffziger et al. |
| 7,159,082 | B1 | 1/2007 | Wade |
| 7,480,810 | B2 | 1/2009 | Gonzalez et al. |
| 7,599,808 | B2 | 10/2009 | Weekly |
| 7,607,028 | B2 | 10/2009 | Douriet et al. |
| 7,720,621 | B2 | 5/2010 | Weekly |
| 7,777,461 | B2 | 8/2010 | Martin et al. |
| 7,839,129 | B2 | 11/2010 | Pant et al. |
| 7,937,563 | B2 | 5/2011 | Naffziger et al. |
| 8,049,476 | B2 | 11/2011 | Schiff |
| 8,099,619 | B2 | 1/2012 | Dibene et al. |
| 8,161,493 | B2 | 4/2012 | Floyd et al. |
| 8,174,288 | B2 | 5/2012 | Dennard et al. |
| 2010/0194470 | A1* | 8/2010 | Monchiero et al. ........... 327/566 |
| 2014/0157033 | A1* | 6/2014 | Eisen et al. ................... 713/340 |

OTHER PUBLICATIONS

Mezhiba, Andrey V., "Design and Analysis of On-Chip High Performance Power Distribution Networks", University of Rochester, copyright 2004, 279 pages.

Mezhiba, Andrey V., "Electrical Characteristics of Multi-Layer Power Distribution Grids", University of Rochester, copyright 2003, pp. V-473-V-476, 4 pages.

Popovich, Mikhail, "High Performance Power Distribution Networks with On-Chip Decoupling Capacitors for Nanoscale Integrated Circuits", University of Rochester, copyright 2007, 370 pages.

Srivastava, Navin, "Impact of On-Chip Inductance on Power Distribution Network Design for Nanometer Scale Integrated Circuits", University of California, copyright 2005, 6 pages.

U.S. Appl. No. 13/693,386, filed Dec. 4, 2012, In re Eisen, International Business Machines Corporation, 52 pages.

Office Action, mailing date Dec. 29, 2014, U.S. Appl. No. 13/693,386, filed Dec. 4, 2012, In re Eisen, International Business Machines Corporation, 26 pages.

Notice of Allowance, mailing date May 29, 2015, U.S. Appl. No. 13/693,386, filed Dec. 4, 2012, in re Eisen, International Business Machines Corporation, 20 pages, available via PAIR/IFW.

* cited by examiner

REDUCING POWER GRID NOISE IN A PROCESSOR WHILE MINIMIZING PERFORMANCE LOSS

CROSS REFERENCE TO RELATED APPLICATIONS

This application is a continuation of commonly assigned U.S. patent application Ser. No. 13/693,386, filed Dec. 4, 2012, which is hereby incorporated herein by reference.

TECHNICAL FIELD

The embodiment of the invention relates generally to reducing power grid noise in a processor and particularly to reducing power grid noise in a processor while minimizing performance loss.

DESCRIPTION OF THE RELATED ART

In high performance processors, or other integrated circuits (ICs), to increase the processing performance of the processor, the processor chip design typically includes one or more of one or more processor cores and one or more pipelines connecting the processor cores. In addition, in a high performance system, a processor system designs often include multiple chips sharing a common supply rail of a power distribution network providing a supply voltage. As the number of processor cores on a same chip or across multiple chips, all sharing a common supply rail, increases, the number of circuits that switch per clock cycle also increases.

In a processor there is noise generated by circuit switching activity at each clock cycle by nodes, buses, and other circuit components sharing a common supply rail. One result of noise generated by circuit switching activity, also referred to as power grid noise or di/dt noise, is that a sudden increase in noise will induce a droop in the supply voltage to the common supply rail of the power distribution network. A sudden, large droop in the supply voltage slows down the circuit response and therefore could cause timing errors on the logical circuit.

To reduce the noise generated by circuit switching activity, a processor may include decoupling capacitors positioned near the switching circuits of the processor cores, where the decoupling capacitors act as a charge reservoir and help reduce noise on the power distribution network as circuit switching activity increases. A processor chip may include many different levels. The supply voltage droop (delta ($\Delta$)V) induced by an increase in circuit switching activity at the chip level is proportional to $\Delta I \sqrt{L/C}$, where $\Delta I$ is the increase in current required by chip level switching circuits on the common supply rail, L is the inductance from the chip level circuits to printed-circuit-board or package level, and C is the summed, chip level capacitance of the circuits on the common supply rail. Since many cores can be activated simultaneously, one limitation of implementing decoupling capacitors to reduce noise is in the case where there is a sudden burst of activity on one or more processor cores, increasing the current, and because $\Delta I$ is directly proportional to the number of cores on the common supply rail, the sudden increase in $\Delta I$ outweighs the noise reduction by the charge reservoirs of the decoupling capacitors, triggering a voltage droop.

BRIEF SUMMARY

In view of the foregoing, there is a need for a method, system, and computer program product for reducing power grid noise to reduce any voltage droop, while minimizing performance loss, in a processor system with multiple processor cores sharing a common supply rail.

In one embodiment, a method for managing a processor is directed to monitoring, by the processor, for an increase in logical operation activity from a low level to a high level during a sampling window across multiple cores sharing a common supply rail of the processor. The method is directed, responsive to detecting the increase in logical operation activity from the low level to the high level during the sampling window, to limiting the logical operations executed on the cores during a lower activity period to a level of logical operations set between the low level and a medium level, where the medium level is an amount between the low level and the high level. The method is directed, responsive to the lower activity period ending, to gradually decreasing the limit on the logical operations on the cores to resume normal operations.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
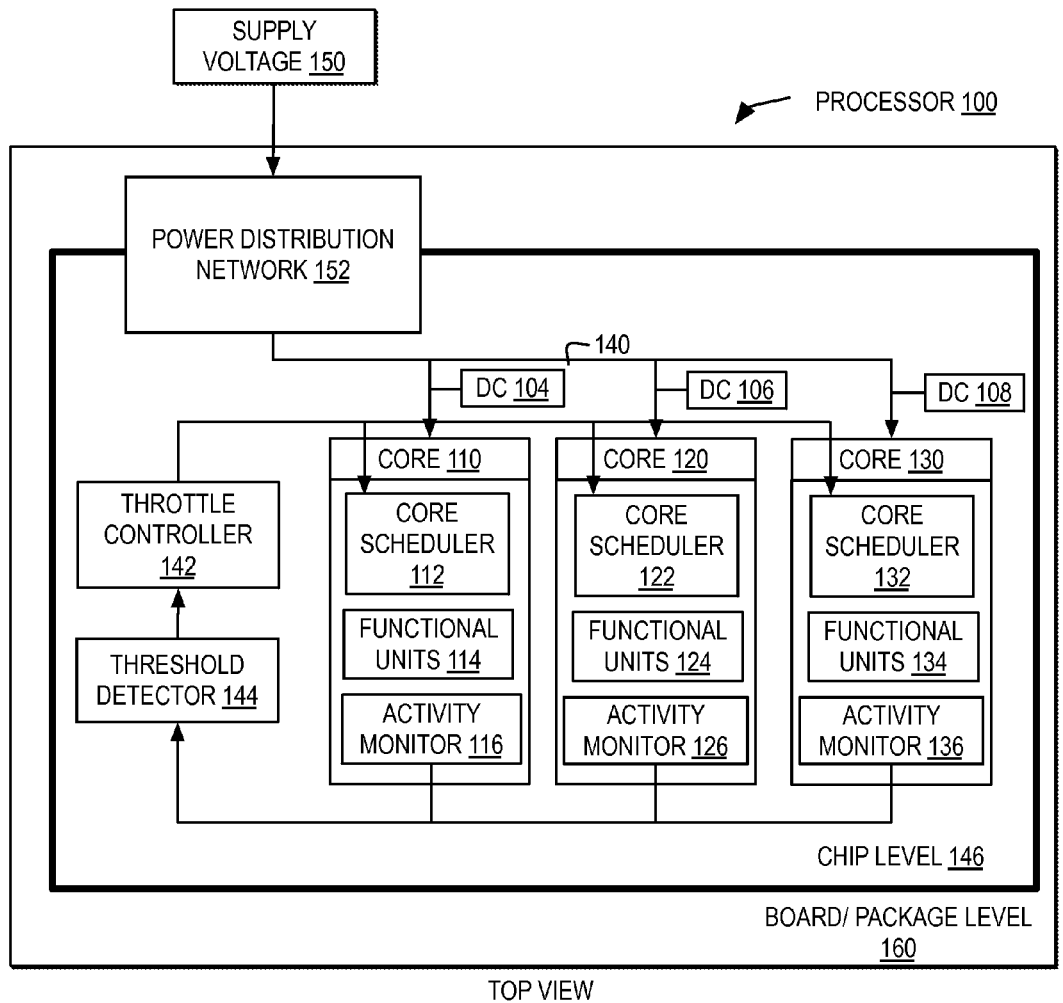
FIG. 1 illustrates a block diagram of one example of a processor system including multiple processor cores sharing a common supply rail and implementing power grid noise reduction stages for reducing power grid noise while minimizing performance loss.
Figure 1:
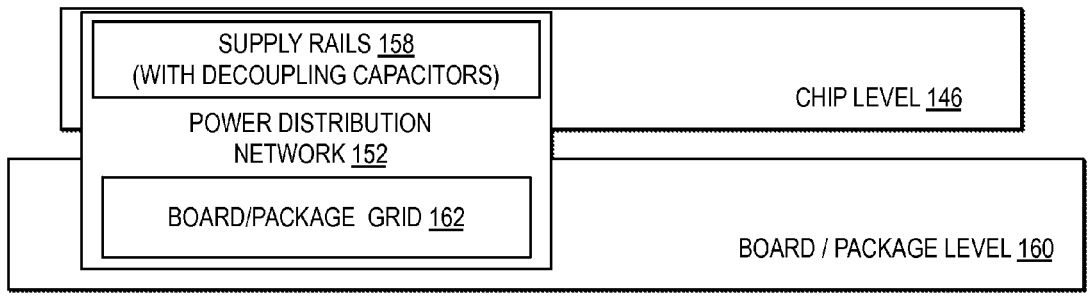

FIG. 1 illustrates a block diagram of one example of a processor system including multiple processor cores sharing a common supply rail and implementing power grid noise reduction stages for reducing power grid noise while minimizing performance loss.

In the example, a processor 100, also referred to herein as a processor system, is connected to a supply voltage 150 that provides voltage over a power delivery network 152, including a common supply rail 140 shared by core 110, core 120, and core 130. Each of core 110, core 120, and core 130 represent multiple switching circuits at a chip level 146 sharing common supply rail 140. By core 110, core 120, and core 130 sharing common supply rail 140, the operating voltage provided by supply voltage 150 over power delivery network 152 may be reduced and the energy efficiency of processor 100 increased. As the number of processor cores sharing common supply rail 140 increases, the savings multiply from reducing the operating voltage and increasing the energy efficiency of processor 100 through the use of a common supply rail shared between the processor cores.

While sharing common supply rail 140 among multiple cores may reduce operating voltages and increase the energy efficiency of processor 100, the switching of circuits within each of the cores on common supply rail 140 introduces noise, referred to as di/dt noise or power grid noise, on power delivery network 152 including common supply rail 140. In the example, to reduce the noise on power delivery network 152 caused by increases in circuit switching activity on common supply rail 140, one or more decoupling capacitors identified as DC 104, one or more decoupling capacitors labeled as DC 106, and one or more decoupling capacitors labeled as DC 108, may be positioned near switching circuits. Each of DC 104, DC 106, and DC 108 represent one or more decoupling capacitor circuits positioned along or near common supply rail 140 to act as charge reservoirs and assist in reducing the noise on the power distribution network 152.

In the example, processor 100 may include multiple levels, which may represent one or more layers, including chip level 146 and a board/package board level 160. In the example, when considered from the top view, chip level 146 may include multiple switching circuits, including multiple small capacitors, along with the decoupling capacitors represented by DC 104, DC 106, and DC 108. In the example, when considered from the side view, chip level may include supply rails 158, with decoupling capacitors, as part of power distribution network 152. In one example, supply rails 158, including common supply rail 140, may include one or more supply rails implemented through one or more power grid distribution layers at chip level 146 using one or more types of grid structures. In the example, when considered from the top view, board/package level 160 includes a board/package grid 162 distributed across one or more portions of board/package level 160, which may be implemented through one or more power grid distribution layers at board/package level 160 using one or more types of grid structures. In the example, power distribution network 152 may include additional or alternate levels through which supply voltage 150 passes, including, but not limited to, a voltage regulation system.

Figure 2:
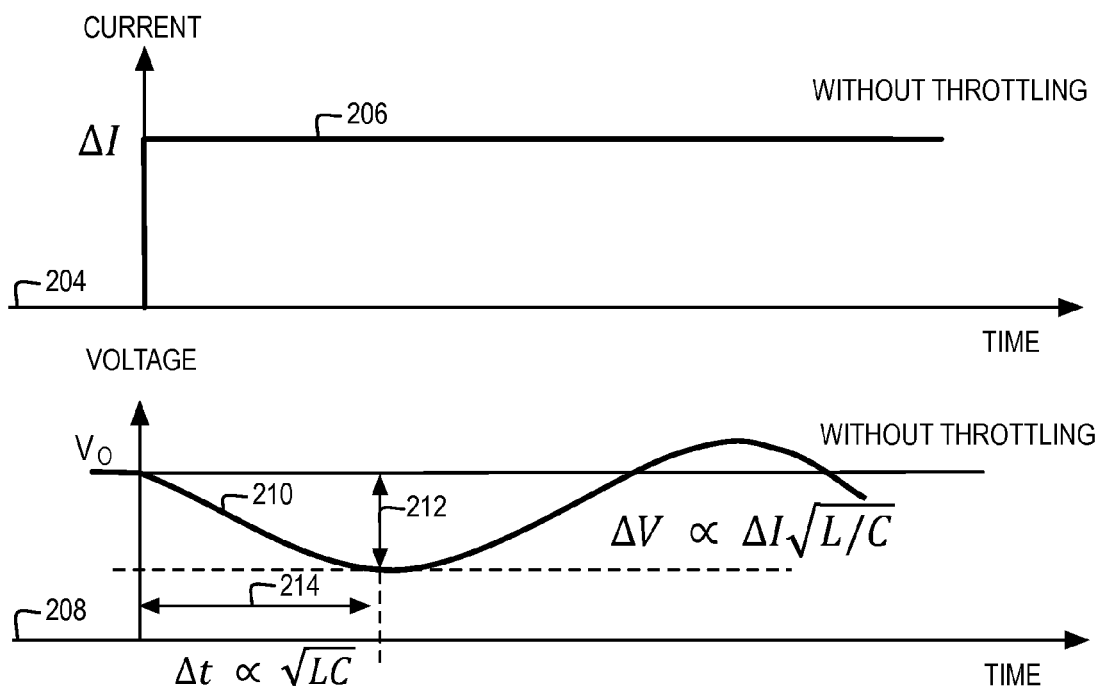
FIG. 2 illustrates a block diagram of one example of a voltage droop induced by sudden increases in circuit switching activity by multiple cores on a common supply rail, if left unmitigated.

In the example, while DC 104, DC 106, and DC 108 can act as charge reservoirs to reduce the noise in the power supply grid caused by increased circuit switching activity of the circuits proximate to DC 104, DC 106, and DC 108, if circuit switching activity on circuits of core 110, core 120, and core 130 increases suddenly, and above certain levels, the voltage droop induced by the sudden increase in activity may still outweigh the noise reduction effects of DC 104, DC 106, and DC 108. In particular, in the example, an increase in the circuit switching activity induces a voltage droop ($\Delta V$) which is proportional to $\Delta I \sqrt{L/C}$, where $\Delta I$ is the increase in current required by the switching circuits at chip level 146 on common supply rail 140, L is the inductance from the circuits at chip level 146 to board/package level 160, and C is the summed capacitance of the circuits at chip level 146 on common supply rail 140. For example, graphs illustrated in FIG. 2 depict the voltage droop induced by sudden increases in circuit switching activity by multiple cores on common supply rail 140, if left unmitigated. In the example in FIG. 2, a graph 204 illustrates current over time, with a sudden current increase ($\Delta I$) 206 illustrating the increased current from all switching circuits of core 110, core 120, and core 130 activating on common supply rail 140. In addition, in the example, a graph 208 illustrates changes to the supply voltage over time ($\Delta V$) through a voltage response curve 210, changing in response to $\Delta I$ 206. In the first example, the sudden current increase of $\Delta I$ 206 results in voltage response curve 210 drooping, as illustrated at reference numeral 212, where the depth of the voltage droop of $\Delta V$ is largest after a package time constant ($\Delta t$), as illustrated at reference numeral 214. In the example, $\Delta t$ is proportional to $\sqrt{LC}$. In the example illustrated in FIG. 2, if the voltage droop of $\Delta V$ is not mitigated, the supply voltage could be less than Vmin, which is the minimum voltage level to ensure logical circuit timing works correctly on processor 100.

In the example illustrated in FIG. 2, since many processor cores sharing a common supply rail can be activated simultaneously, a worst case $\Delta I$ is directly proportional to the number of processor cores on the common supply rail because the effect of the sudden current increase for the worst case $\Delta I$ on the voltage droop of $\Delta V$ outweighs the incremental increase in voltage provided by decoupling capacitors acting as charge reservoirs, and if the voltage droop is left uncurbed, processor circuits may fail. In one example, to reduce the voltage droop of $\Delta V$ in the event of a sudden current increase, the operating frequency of processor 100 may be reduced to maintain power consumption, however reducing the operating frequency may impact processor performance. In another example, to reduce the voltage droop $\Delta V$ triggered by a sudden current increase, the operating voltage supplied by supply voltage 150 on the common supply rail may be raised by $\Delta V$ to maintain the minimum voltage required for all circuits to function at the same frequency at all time, however since power has a strong dependency on voltage, raising voltage is not an option on all systems. In another example, to reduce the voltage droop of ΔV in the event of a sudden current increase, the number of logical operations executed by each processor core may be throttled to reduce circuit switching activity, reduce the current, and reduce any voltage droop, however, any reduction of circuit switching activity also impacts performance and processing speeds of processor 100. In the example, logical operation throttling may limit the number of instructions dispatched and issued within a processor core.

Returning to FIG. 1, in the example illustrated, processor 100 reduces power grid noise on power distribution network 152 while minimizing processor performance loss by implementing power grid noise reduction over three stages. The power grid noise reduction stages make determinations of whether to throttle logical operations to reduce current, at what magnitude to limit logical operations, and how long to limit logical operations, to minimize processor performance losses that may occur during logical operation throttling.

In one example, a first stage of the power grid noise reduction stages, determines whether and when to start logical operation throttling by monitoring for an increase in logical operation activity from a low level of logical operations to a high level of logical operations, over a sampling time that includes multiple time windows. In the example, to implement a first stage of the power grid noise reduction stages, processor 100 includes components for monitoring for sudden bursts of logical operation activity of a level that will trigger a voltage droop, illustrated by an activity monitor 116, an activity monitor 126, an activity monitor 306, and a threshold detector 144. In the example, each of core 110, core 120, and core 130, include a core scheduler, illustrated as a core scheduler 112, a core scheduler 122, and a core scheduler 132. In the example, each of core scheduler 112, core scheduler 122, and core scheduler 132 manage the dispatch and issue of instructions, also described as logical operation executions, for one or more functional units within each processor core, illustrated as functional units 114, functional units 124, and functional units 134. In the example, each of core 110, core 120, and core 130 include an activity monitor, illustrated by activity monitor 116, activity monitor 126, and activity monitor 136. Each of activity monitor 116, activity monitor 126, and activity monitor 136 monitor the instruction streams from one or more of the core schedulers and functional units, to count the number of logical operations, being executed by each core during one or more time windows.

In the example, each of activity monitor 116, activity monitor 126, and activity monitor 136 include three or more logical counters that count the number of logical operations over three consecutive time windows. Each of activity monitor 116, activity monitor 126, and activity monitor 136 evaluate whether the number of logical operations counted over three consecutive time windows is indicative of a sudden burst of logical operation activity that will cause a sudden increase in circuit switching activity and power grid noise, which will generate a sudden increase in noise larger than what is mediated by DC 104, DC 106, and DC 108 and lead to an unwanted voltage droop. For example, to detect a sudden burst of activity, each of activity monitor 116, activity monitor 126, and activity monitor 136 will evaluate whether the number of logical operations over three consecutive time windows moves from a low level to a high level in the first two time windows or moves from a low level to a medium level to a high level over the three time windows. If an activity monitor detects a pattern in the increased number of logical operations over three consecutive time windows indicative of a sudden burst of activity that will increase the power grid noise and trigger a voltage droop, the activity monitor sets a sudden activity flag.

In the example, by the activity monitors counting the number of logical operations on each processor core in real time over three time windows and assessing a level of activity associated with each time window, the activity monitors quickly detect, in real-time, when logical operation activity occurs that is indicative of sudden bursts of activity that, if present across a threshold number of processor cores sharing a common supply rail, will increase the power grid noise and trigger voltage droops. In another example, in addition to or as an alternative to one or more of the grid noise reduction stages, processor 100 may also include one or more controllers that store a history of voltage droops and the instruction activity that caused the voltage droops, estimate the impact of certain types of instructions on the voltage based on the history of voltage droops, and monitor for the types of instructions that are estimated to use the history of voltage droops to predict upcoming voltage droops and attempt to reduce the number of instructions before a voltage droop even starts, however, attempting to predict voltage droops based on weights given to types of instructions, rather than based on real-time counts of logical operations, and triggering instruction throttling to avoid any voltage droop from starting, may trigger premature logical operation throttling. In another example, processor 100 may include one or more controllers that monitor voltage, and responsive to detecting a voltage droops itself, trigger logical operation throttling.

In the example, processor 100 includes threshold detector 144 that monitors for sudden activity flags from a selection of processor cores sharing common supply rail 108. In the example, threshold detector 144 monitors for sudden activity flags set by activity monitor 116, activity monitor 126, and activity monitor 136. In the example, during the first stage, if threshold detector 144 detects sudden activity flags set for a threshold number of cores sharing common supply line 140, threshold detector 144 triggers a second stage of the power grid noise reduction stages by triggering a throttle controller 142 to start. In one example, the threshold number of cores reporting sudden activity flags may be set to one core, two cores, or three cores. In the example, by first counting logical operations per core, over three time windows, and determining whether to set sudden activity flags after a third window, any high priority instructions can finish executing before instruction throttling starts, however, instruction throttling still starts prior to the voltage droop reaching a greatest depth after a time duration equal to the package time constant, the power grid noise is reduced and the voltage droop is reduced.

In addition, while in the example processor 100 is illustrated with a separate activity monitor for each processor core, in another example, a single activity monitor may monitor the logical operations across multiple processor cores or multiple processors during a sampling window and detect whether the logical operation activity for a sampling window increases from a low level to a high level indicating a sudden burst of activity that may increase the power grid noise and trigger a voltage droop. In addition, while in the example processor 100 is illustrated with a separate activity monitor for each processor core and a separate threshold detector 144, in another example, a single activity monitor may monitor the logical operations across multiple processor cores and detect whether the logical operation activity for a sampling window increases from a low level to a high level, but not set trigger throttle controller 142 unless an overall amount of logical operation activity sampled across the multiple processor cores reaches a threshold level of logical operation activity.

In the example, in a second stage of the power grid noise reduction stages, when throttle controller 142 is triggered, throttle controller 142 lowers the circuit switching activity in processor 100, over a time period less than Δt, by sending signals to core scheduler 112, core scheduler 122, and core scheduler 132 to limit the number of logical operations executed within core 110, core 120, and core 130. Throttle controller 142 may issue one or more types of signals and implement one or more types of throttling patterns to limit the number of logical operations executed within cores. In one example, throttle controller 142 may send signals, such as by sending a block instruction fetch, a block instruction dispatch, and a block instruction issue, that when received by the core schedulers, insert lack of activity bubbles into the instruction stream, where the lack of activity bubbles result in no operation issuing during one or more clock cycles and a decrease in switching activity. In the example, where signals are sent that insert lack of activity bubbles into the instruction stream, the frequency at which signals are sent to insert the lack of activity bubbles into the instruction stream affects the amount of the decrease in switching activity. In another example, throttle controller 142 may send signals specifying, for each clock cycle, of a number of instructions to allow to issue for the clock cycle, to limit the activity on each core to issuing a certain number of instructions per clock cycle.

In the second stage, in particular, throttle controller 142 sends signals to core scheduler 112, core scheduler 122, and core scheduler 132 to reduce the number of logical operations executed in each core to a level set between a low and medium level of instructions, to reduce the circuit switching activity of core 110, core 120, and core 130, leading to reductions in the current consumption on the chip, to prevent a voltage droop from reaching the depth illustrated at reference numeral 212. In the example, while throttle controller 142 could limit the number of logical operations to a low level of instructions or stop and then reissue the instructions, by throttle controller 142 limiting the number of logical operations to a level between the low and medium levels of instructions, as the activity monitors continue to monitor logical operation activity, the activity monitors may detect an actual low level of logical operations during a time window, while concurrently reducing the power grid noise and reducing voltage droop, and trigger throttle controller 142 to perform the second stage of the power grid noise reduction stages in a next time window, rather than transitioning to the third stage of the power grid noise reduction stages.

In the example, in a third stage of the power grid noise reduction stages, when throttle controller 142 reaches the end of the time period for the second stage, throttle controller 142 gradually releases the limits on the number of logical operations allowed to be executed within core 110, core 120, and core 130 to resume normal operation, at a rate that will not cause a sudden increase in circuit activity causing a voltage droop greater than the lowest voltage reached in the second stage. In one example, if throttle controller 142 sends signals that cause bubbles to be created and inserted into the instruction stream at a particular frequency in the second stage to reduce switching activity to a level between a low level and medium level, then during the third stage, throttle controller 142 will gradually decrease the frequency at which bubbles are introduced into the instruction stream from the particular frequency in the second stage to no signals inserting bubbles into the instruction stream.

In the example, throttle controller 142 is described as sending signals to the core scheduler of each core sharing a common supply rail to reduce the instruction levels permitted on each processor core to a same level. In another example, throttle controller 142 may send different signals to different core schedulers, limiting each core scheduler to a different level of instructions. In addition, each processor core may evaluate low, medium, and high levels of activity using different sets of expected levels and a signal output by throttle controller 142 to each core scheduler designating a low, medium, or high level of activity throttling, may be applied by each core scheduler according to the set of expected levels available to the core scheduler.

While in the example processor 100 only includes three cores, in other examples, processor 100 may include additional cores that share common supply rail 108, where each additional core includes a core scheduler tied to throttle controller 142, functional units, and an activity monitor tied to threshold detector 144. In addition, while in the example throttle controller 142 and threshold detector 144 are illustrated as components of processor 110 separate from core 110, core 120, and core 130, in additional or alternate examples, one or more of core 110, core 120, and core 130 may incorporate throttle controller 142 and threshold detector 144 or one or more of throttle controller 142 and threshold detector 144 may be implemented at chip level 146, but on a separate chip from the chip housing core 110, core 120, and core 130. In addition, while in the example each of core 110, core 120, and core 130 include a separate core scheduler and a separate activity monitor, in other examples, selections of cores from among core 110, core 120, and core 130 may share a core scheduler and an activity monitor.

In addition, in an additional or alternate embodiment, a processor group may include multiple instances of processor 100 that share a common supply rail, and therefore each core in each processor shares the common supply rail, where throttle controller 142 and threshold detector 144 are shared by the multiple instances of processor 100 or where each processor instance includes a throttle controller and threshold detector. In another example, where a processor group includes multiple instances of processor 100 that share a common supply rail, each processor instance may include a throttle controller for locally throttling instructions of cores and a threshold detector for locally detecting sudden activity flags from cores, and the processor group may include a group threshold controller for receiving signals from the local threshold detectors and determining whether to trigger a group throttle controller to trigger the local throttle controllers to locally throttle instructions. In additional or alternate embodiments, as the number of processor cores sharing a common supply rail or the number of processors in a processor group sharing a common supply rail increase, whether on a same chip or on different chips, any instances of throttle controller 142 and threshold detector 144, whether local or group, may be positioned to minimize the space, performance, and energy use impact of the switches required for the instances of throttle controller 142 and threshold detector 144. In addition, in additional or alternate embodiments, multiple processor cores may share a common supply rail through separate instances of power distribution network 152 sharing access to a same supply voltage 150, where separate selections of processor cores access separate instances of power distribution network 152.

Figure 3:
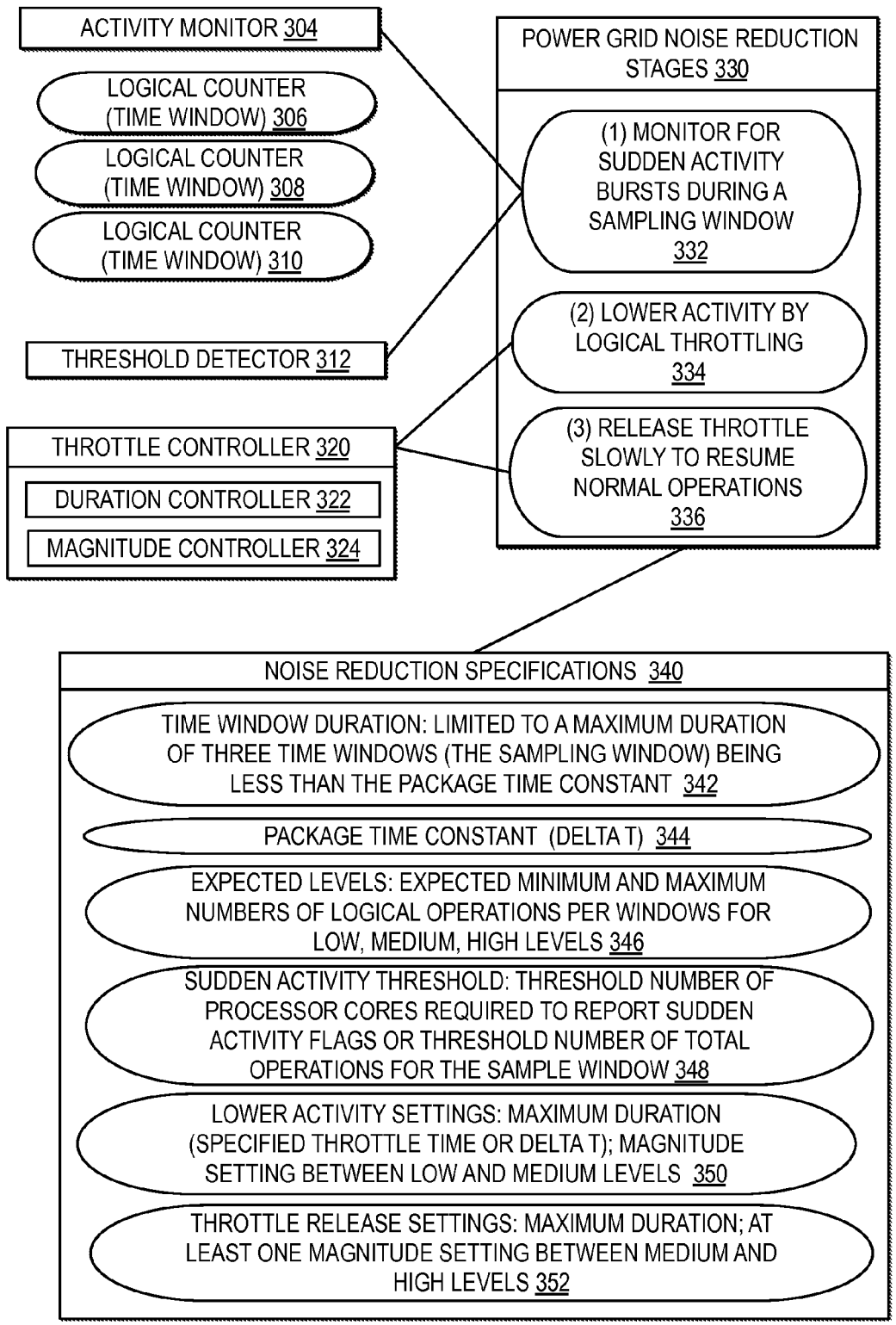
FIG. 3 illustrates a block diagram of one example of one or more components for implementing power grid noise reduction stages for reducing power grid noise while minimizing performance loss in a system with multiple processor cores sharing a common supply rail.

FIG. 3 illustrates a block diagram of one example of one or more components for implementing power grid noise reduction stages for reducing power grid noise while minimizing performance loss in a system with multiple processor cores sharing a common supply rail.

In the example, power grid noise reduction stages 330 illustrates examples of one or more stages implemented in a processor system with multiple processor cores sharing a common supply rail, whether the cores are implemented in a single processor, multiple processors, or multiple processor groups. Power grid noise reduction stages 330 includes three implementation stages including a first stage illustrated at reference numeral 332 of monitoring for sudden activity bursts during a sampling window, a second stage illustrated at reference numeral 334 of lowering activity by logical throttling, and a third stage illustrated at reference numeral 336 of gradually releasing the throttle to resume normal operations. In the example, in addition to or as an alternative to power grid noise reduction stages 330, a processor or group of processors may include additional or alternative stages, components, and steps for reducing power grid noise.

In one example, one or more of the stages of power grid noise reduction stages 330 are implemented through one or more of at least one activity monitor 304, at least one threshold detector 312, and at least one throttle controller 320. In addition, power grid noise reduction stages 330 may be implemented through additional or alternate components within a processor or group of processors.

In addition, in the example, power grid noise reduction stages 330 are implemented within a particular processor or group of processors according to one or more settings in noise reduction specifications 340. In the example, noise reduction specifications 340 include a time window duration 342, where each time window duration 342 is limited by a maximum duration of three time windows, or the sampling window, being less than the package time constant. In addition, noise reduction specifications 340 includes a chip package oscillation time constant ($\Delta t$) 344, equal to $2\pi\sqrt{LC}$. In addition, noise reduction specifications 340 includes expected levels 346 including minimum and maximum number of instructions per window for low, medium, and high activity levels, a sudden activity threshold 348 including a threshold number of processor cores required to report sudden activity flags or a threshold number of total operations for the sampling window, lower activity settings 350 for specifying the duration and magnitude of throttling settings for lowering the activity across the processor cores, and throttle release settings 352 for specifying the duration and magnitude of throttle settings for gradually returning the activity across the processor cores to normal levels.

In the example, as previously describe each processor core may include an instance of activity monitor 304 and a separate selection of at least three activity counters, illustrated in the example as a logical counter 306 for a time window, a logical counter 308 for a time window, and a logical counter 310 for a time window. In another example, one or more processor cores may share activity monitor 304 and the activity counters.

Each of logical counter 306, logical counter 308, and logical counter 310 count logical operations indicating activity within one or more processor cores during a separate, consecutive time windows. The length of the time windows during which each of logical counter 306, logical counter 308, and logical counter 310 count activity is described in the examples as a same length per time window, however the logical counters may also be set to count time windows of different lengths. In the example illustrated, the combined length of the consecutive time windows, or the sampling window, counted by logical counter 306, logical counter 308, and logical counter 310 is limited by time window duration 342 of being less than package time constant 344. While the example is illustrated with respect to counting three consecutive time windows using three separate logical counters, in additional or alternate embodiments, other numbers and types of counters and other logic may be implemented to count the three consecutive time windows and in additional or alternate embodiments, additional counters may be implemented to count more than three consecutive time windows at a time. Moreover, while the example is illustrated with respect to three consecutive time windows, in other examples, less than three consecutive time windows may be implemented.

In the example, logical counter 306, logical counter 308, and logical counter 310 monitor logical operation activity during consecutive time windows, in rotation. In one example, logical counter 306 includes a count for an oldest time window, logical counter 308 includes a count for a next oldest time window following the oldest time window, and logical counter 310 is currently counting during a time window following the next oldest time window. In another example, logical counter 310 includes an count for an oldest time window, logical counter 306, in rotation, includes a count of a next oldest time window following the oldest time window, and logical counter 308 is currently counting during a most recent time window following next oldest time window. As described herein, the oldest time window may be referred to as the first time window or T1, during a sampling period, the next oldest time window may be referred to as the second time window or T2, and the most recent time window may be referred to as the third time window or T3.

In one example, each time one of logical counter 306, logical counter 308, and logical counter 310 finishes counting logical operation activity during a time window, and all three time windows have counted logical activity, activity monitor 304 may determine whether the number of logical operations counted by the logical counter meets a low, medium, or high activity level, according to expected levels 346 specifying the expected minimum and maximum number of instructions per window for low, medium, and high activity levels. In one example, expected levels 346 are the same for each processor core. In another example, expected levels 346 may be specified per processor core and reflect the operating characteristics of each core as impacted by one or more factors including, but not limited to, the types of functional units and types of instructions handled by the core, the position of the core in relation to decoupling capacitors, the common supply rail, and other cores, and the number of cores grouped together.

Activity monitor 304 determines from the activity levels assigned to the logical operation activity in each of logical counter 306, logical counter 308, and logical counter 310, from the oldest time window to the most recent time window, whether there is a change in activity level from a first time window to a second time window from low to high or whether there is a change in activity level from the first time window, to the second time window, to the third time window from low, to medium, to high. If activity monitor 304 detects that the change in activity level is from low to high from the first time window to the second time window or from low to medium to high from the first window to the second time window to the third time window, then activity monitor 304 detects logical operation activity indicative of a sudden activity change and sets a sudden activity flag for the processor core.

In the example, threshold detector 312 monitors for sudden activity flags set by one or more activity monitors for one or more processor cores, processors, or processor groups sharing a common supply rail. In the example, threshold detector 312 compares the number of sudden activity flags detected for a time window against sudden activity threshold 348 specifying the threshold number of processor cores required to report sudden activity flags. If the number of sudden activity flags detected by threshold detector 312 for a time window meets sudden activity threshold 348, then threshold detector 312 determines that there has been an increase in logical operation activity during a sampling window indicative of a sudden burst of activity across the cores sharing a common supply rail, in stage 332, sufficient to trigger stage 334.

In another example, if threshold detector 312 only monitors a single activity monitor, if a sudden activity flag is set, threshold detector 312 may compare the total number of logical operations counted during the sampling window with a threshold number of total operations for the sampling window specified in sudden activity threshold 348, and if the threshold number of total operations for the sampling window is reached, threshold detector 312 will trigger stage 334.

In the example, when threshold detector 312 determines that in stage 332 there are sudden bursts of activity meeting the requirements of sudden activity threshold 348, threshold detector 312 triggers throttle controller 320 to start stage 334 for a time period, and thereafter to start stage 336 for another time period. In the example, throttle controller 320 includes a duration controller 322 that controls how long throttling occurs for each of stage 334 and stage 336 and a magnitude controller 324 that controls the magnitude of throttling for each of stage 334 and stage 336.

In the example, during stage 334, threshold detector 312 outputs one or more signals to the processor cores sharing a common supply rail to limit the number of logical operations executed on each processor core, according to lower activity settings 350. In one example, lower activity settings 350 specify a maximum duration for controlling duration controller 322 of the lower of a specified throttle time or package time constant 344. In addition, in one example, lower activity settings 350 specify a magnitude setting for magnitude controller 324 to send out signals to the core schedulers of the processor cores sharing a common supply rail to limit the number of logical operations allowed for each processor core to a number set between the minimum and maximum numbers of logical operations for the low level and medium level set in expected levels 346.

In the example, at the conclusion of stage 334, threshold detector 312 automatically starts stage 336. During stage 336, threshold detector 312 outputs one or more signals to the core schedulers of the processor cores sharing a common supply rail to gradually release the limit on the number of logical operations executed on each processor core, according to throttle release settings 352. In one example, throttle release settings 352 specify a maximum duration for controlling duration controller 322 during the release of the instruction limits and a magnitude setting for magnitude controller 324 to gradually release the logical operation limits to an activity level between a medium level and a high level in expected levels 346, and then to stop sending any limiting signals and allow the core schedulers of each core to resume normal operations. In one example, the maximum duration set in throttle release settings 352 may be set to a particular percentage of the package time constant, such as 50%+/−10%.

As illustrated in the example, activity monitor 304, logical counter 306, logical counter 308, and logical counter 310 are illustrated as examples of logic components included in each processor core. In additional or alternate embodiments, multiple processor cores or processor groups may share a single activity monitor and set of three logical counters. In addition, the example, a processor system with multiple processor cores sharing a common supply rail may include one or more instances of threshold detector 312 and throttle controller 320 as components separate from any of the monitored processor core or as components implemented within one or more processor cores and may include local and group instances of threshold detector 312 and throttle controller 320.

Figure 4:
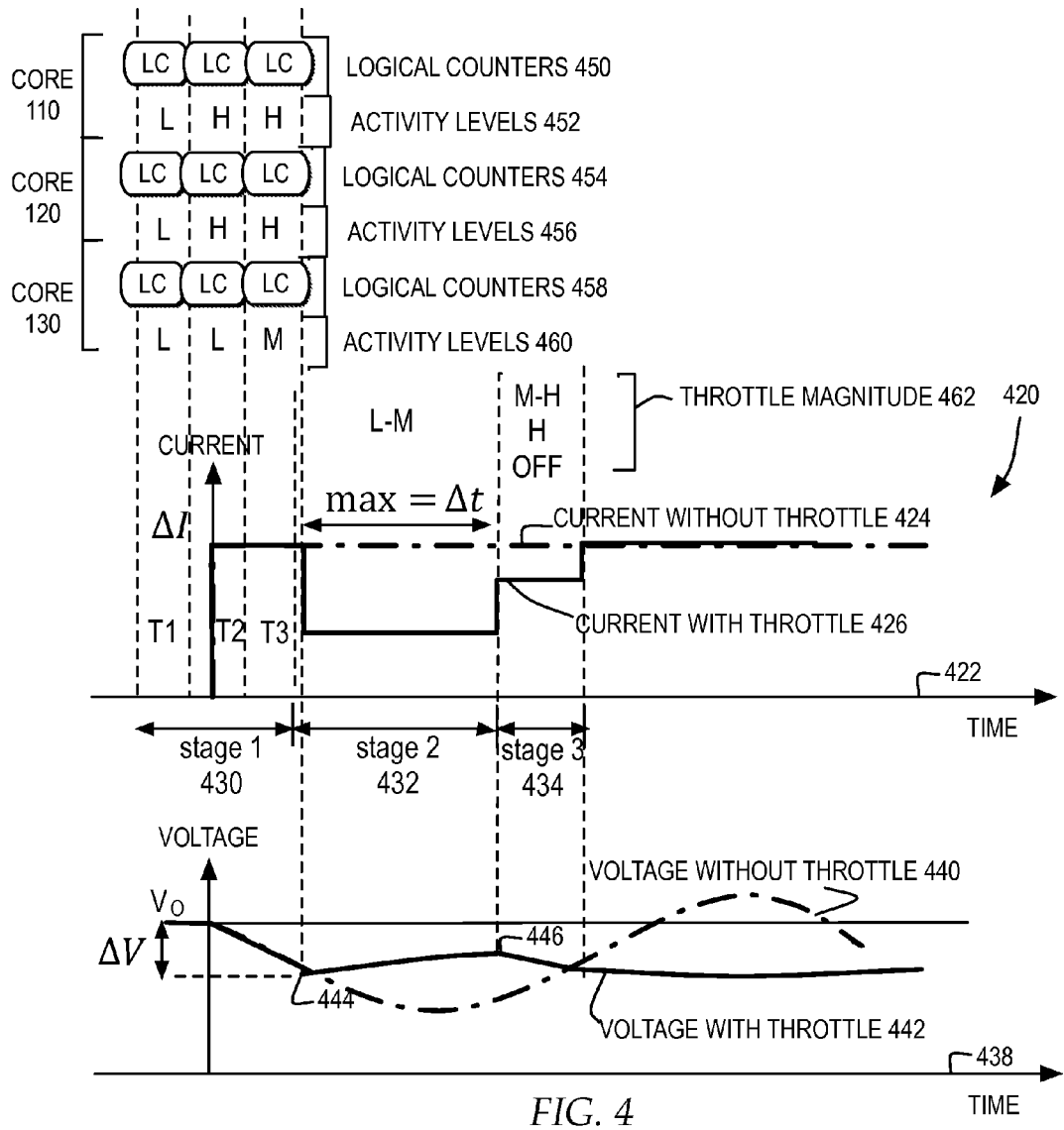
FIG. 4 illustrates examples of graphs depicting current and voltage measured across a common supply rail shared by multiple cores in an instance when no throttling is performed in contrast to an instance when the power grid noise reduction stages are performed, including throttling, to reduce grid noise while minimizing performance degradation.

FIG. 4 illustrates examples of graphs depicting current and voltage measured across a common supply rail shared by multiple cores in an instance when no throttling is performed in contrast to an instance when the power grid noise reduction stages are performed, including throttling, to reduce grid noise while minimizing performance degradation.

In the example, a current graph 422 and a voltage graph 438 illustrate examples of two sets of current over time and voltage over time taken on common supply rail 140. A first example reflects a current without throttle 424 and voltage without throttle 440, without throttling on common supply rail 140 if no power grid noise reduction stages are implemented, where current without throttle 424 and voltage without throttle 440 are illustrated partially using a dotted line and mirror current change 206 and voltage response curve 210 in FIG. 2. A second example reflects a current with throttle 426 and a voltage with throttle 442, on common supply rail 140 when power grid noise reduction stages 330 are implemented.

In the example, during a stage 1 430, representing stage 322, a separate set of logical counter 306, logical counter 308, and logical counter 310 monitor the activity counts in each processor core on a common supply rail. In the example illustrated in FIG. 4, a set of logical counters 450 represent an instance of logical counter 306, logical counter 308, and logical counter 310 for processor core 110 and activity levels 452 illustrate examples of the activity levels determined the counts in from logical counters 450 for processor core 110 for each of the three consecutive time windows of a sampling window labeled T1, T2, and T3 of low (L), high (H), and high (H). In the example illustrated in FIG. 4, a set of logical counters 454 represent an instance of logical counter 306, logical counter 308, and logical counter 310 for processor core 120 and activity levels 456 illustrate examples of the activity levels determined the counts in from logical counters 454 for processor core 120 for each of the time windows labeled T1, T2, and T3 of low (L), high (H), and high (H). In addition, in the example illustrated in FIG. 4, a set of logical counters 458 represent an instance of logical counter 306, logical counter 308, and logical counter 310 for processor core 130 and activity levels 460 illustrate examples of the activity levels determined the counts in from logical counters 458 for processor core 130 for each of the time windows labeled T1, T2, and T3 of low (L), low (L), and medium (M).

In the example depicted, based on the change in activity level from T1 to T2 of low to high in processor core 110 and processor core 120, the instances of activity monitor 304 for each of core 110 and core 120 set a sudden activity flag. Assuming that sudden activity threshold 348 is set to two or more processor cores, threshold detector 312 detects two sudden activity flags set by processor cores sharing a common supply rail and trigger stage 334, illustrated in FIG. 4 by stage 2 432.

In the example, as illustrated, during stage 1 430, the result of the sudden change in logical activity on both processor core 110 and processor core 120 from time window T1 to time window T2, is a sudden increase in current ΔI, reflected in both current without throttle 424 and current with throttle 426. In the example, in response to the sudden increase in current ΔI during time window T2, a voltage droop is triggered, reflected in both voltage without throttle 440 and voltage with throttle 442. In the example, stage 1 430 ends after time window T3 and stage 2 432 begins with throttle controller 320 lowering the number of logical operations. In the example, the three time windows of stage 1 430 are cumulatively set to a time period long enough so that when a high level of activity is detected in T2 or T3, the most urgent instructions can still be executed before throttling begins, however, the three time windows of stage 1 430 are set to a cumulative time period of less than the package time constant so that the voltage droop can be effectively reduced. As illustrated by throttle magnitude 462 in stage 2 432, throttle controller 320 reduces the number of logical operations executed in each processor core to a level between the low (L) and medium (M) levels of activity. As a result of throttle controller 320 reducing the number of logical operations executed in each processor core to a level between low and medium levels of activity, the grid noise and current is also lowered to a level reflective of the reduction in switching circuit activity from the reduction in logical operation activity, as illustrated by current with throttle 426. As a result of reducing the grid noise and current, the voltage droop is also curbed, as illustrated at point 444, where the voltage curve of voltage with throttle 442 stops drooping before reaching the maximum depth illustrated in voltage without throttle 440. As illustrated, voltage with throttle 442 shows a reduced voltage droop starting at point 444 when compared with voltage without throttle 440. In the example, there is an option to direct throttle controller 320 to reduce the activity level to the lowest level of activity or to stop all activity, however by only reducing the level of activity to a level between the low and medium level, an actual low can still be sampled and detected by activity monitors during a next stage 1 sampling of activity during time windows, occurring during stage 2 432. In the example, the length of stage 2 432 is limited to a time period no longer than the package time constant because voltage is recovered to a highest point, for the current activity levels, after a time period equal to the package time constant and if stage 2 432 lasts for a time period longer than the package time constant, then the voltage may start to fall again due to the oscillating nature of voltage.

In the example, stage 3 434 follows stage 2 432. In stage 3 434, throttling controller 320 gradually returns the number of logical operations executed by each processor core to a normal level, where the result in increasing the number of logical operations executed by each processor to a normal level is an increase in switching circuit activity, leading to an increase in current to a new current level that is lower than the highest current level, as illustrated by current with throttle 426 within stage 3 434. As illustrated in graph 438, when the current increases in stage 3 434, the voltage with throttle begins to droop slightly, but without drooping more than the first voltage droop in stage 1 430. At the end of stage 3 434, throttle controller 320 gradually releases any limits on the number of logical operations executed by each processor core and the current level may rise.

Although not depicted in the example in FIG. 4, even after stage 2 432 begins, the logical counters in each processor core continue to count the logical operations in the instruction streams over consecutive time windows, the activity monitors in each processor continue to determine whether to set sudden activity flags based on current activity levels, and the threshold controller continues to monitor for sudden activity flags and determine whether to trigger throttle controller 320 to lower the activity levels on the processor cores. By continuously counting the logical operations in the instruction streams in each processor core and monitoring for sudden activity increases among processor cores sharing a common supply rail, even concurrent with throttling by throttle controller 320, sudden logical operation activity increases causing a sudden current increase can be detected and responded to within a processor system during any stage to reduce the voltage droop caused by grid noise during sudden current increases, with minimal processor performance loss.

Figure 5:
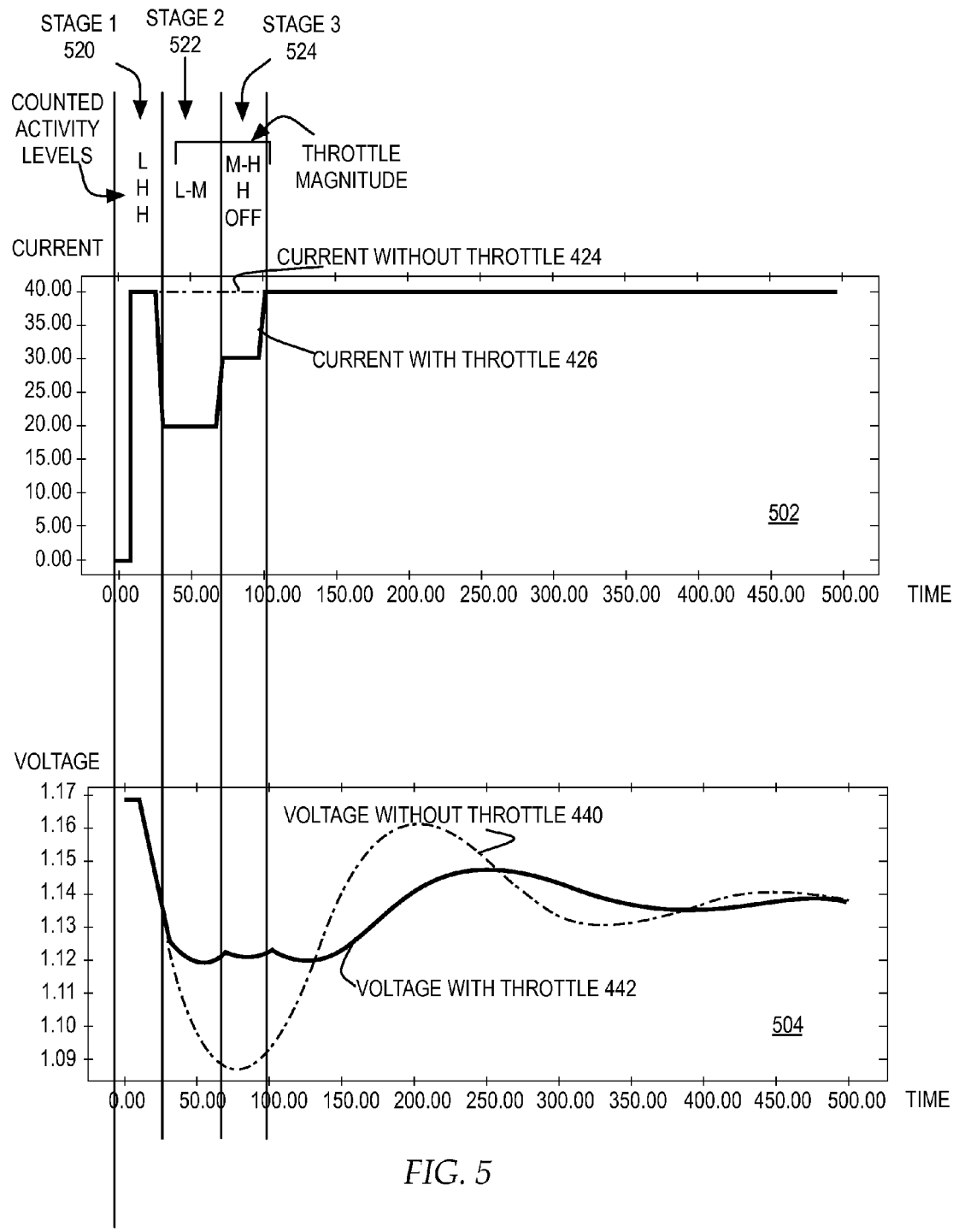
FIG. 5 illustrates one example of graphs showing current and voltage changes in a processor system with multiple processor cores sharing a common supply rail in a simulation in which all processor cores are activated at a same time to a high level of activity for a period of time longer than the package time constant.

FIG. 5 illustrates one example of graphs showing current and voltage changes in a processor system with multiple processor cores sharing a common supply rail in a simulation in which all processor cores are activated at a same time to a high level of activity for a period of time longer than the package time constant. In the example a graph 502 illustrates one example of current changes with the implementation of power noise reduction stages 330 in a processor system, illustrated as current with throttle 426, and the current changes if no throttling is performed, illustrated as current without throttle 424 as a dotted line in the areas where the current with throttle and current without throttle do not overlap. In addition, in the example, a graph 504 illustrates examples of the voltage curve response to the current changes with the implementation of power noise reduction stages 330 in a system, illustrated as voltage with throttle 442, and the voltage changes if no throttling is performed, illustrated as voltage without throttle 440 as a dotted line in the areas where the voltage with throttle and voltage without throttle do not overlap.

In particular, in one example, graph 502 and graph 504 illustrate the current and voltage changes simulated in a processor system with three processor cores sharing a common supply rail in which the original instruction stream generates a maximum activity burst from all cores simultaneously and the burst last longer than the package constant time. In the simulation described, the voltage droop illustrated in voltage with throttle 442 shows a reduction in voltage droop by 50% when compared with the voltage droop illustrated in voltage without throttle 440.

In the example, during a stage 1 520, representing stage 332 of grid power noise reduction stages 330, logical operation activity levels across three consecutive time windows of three processor cores are detected as low (L), high (H), and high (H), indicating a simultaneous sudden activity change causing a voltage droop and triggering a stage 2 522 of the grid power noise reduction stages. Stage 2 522 represent stage 334 of power grid noise reduction stages 330.

Next stage 2 522 illustrates a throttle controller set to reduce the number of logical instructions allowed to execute within each of the three processor cores to a level of activity defined as a low to medium level of activity, causing current with throttle 426 to decrease from 40 amps to a level of 20 amps. In comparison, if no throttling is performed the current would remain at 40 amps, as illustrated by current without throttle 424.

In response to the reduction in current with throttle 426 during stage 2 522, the voltage drooping is curbed at 1.12 volts and begins to increase during stage 2 522. In comparison, if no throttling is performed the voltage would droop to 1.09 volts, as illustrated by voltage without throttle 440.

At the end of stage 2 522, which has a duration no longer than the package time constant, a stage 3 524 of the grid power noise reduction stages is triggered, setting a throttle controller to gradually increase the number of logical instructions allowed to execute within each of the three processor cores to a level of activity defined as a medium to high level of activity, to a level of activity defined as a high level of activity, allowing for normal operations. In response, during stage 3 524, the voltage drooping illustrated in voltage with throttle 442 does not return to a value lower than 1.12 volts, and continues to increase, while also starting to oscillate. In comparison, if no throttling is performed the voltage without throttle 440 oscillates from a voltage droop at 1.09 volts to a voltage of 1.16 volts.

Figure 6:
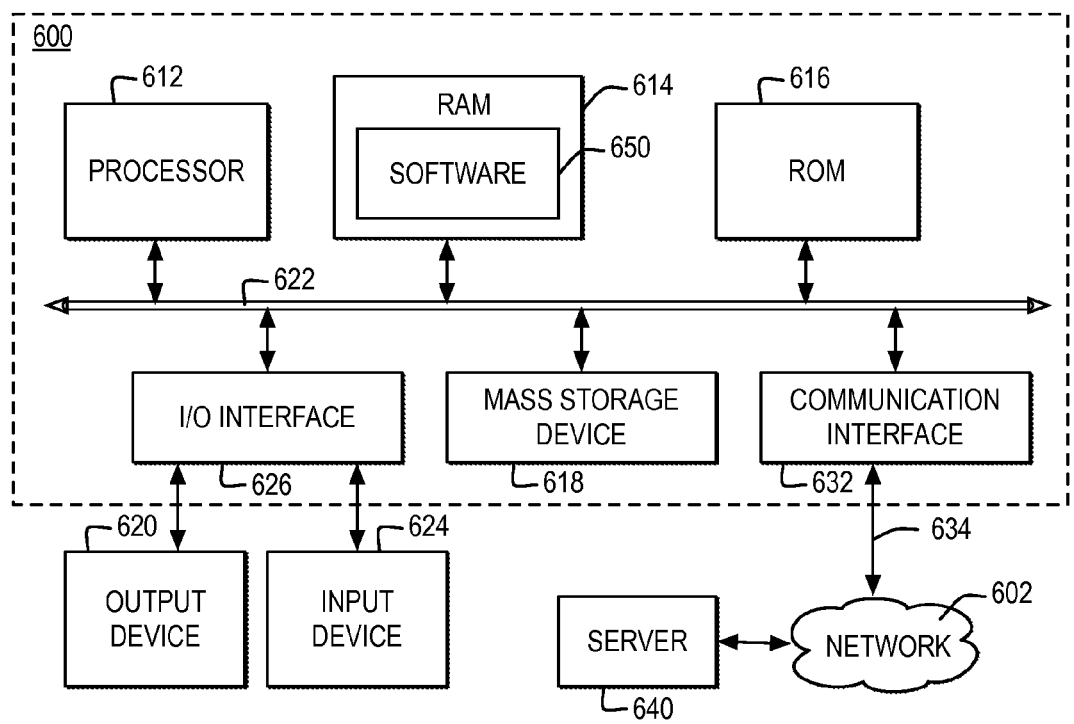
FIG. 6 illustrates a block diagram of one example of a computer system in which one embodiment of the invention may be implemented.

FIG. 6 illustrates a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network servicing power. Where multiple processors share bus 622, additional controllers (not depicted) for managing bus access and locks may be implemented.

Processor 612 may represent processor 100, including multiple cores that share a common supply rail in a power distribution network. In addition, processor 612 may represent multiple processors, in a processor group, where one or more of the processors in the processor group share a common supply rail in a power distribution network. Processor 612 may represent one or more physical integrated circuit chips.

Processor 612 may be at least one general-purpose processor such as IBM® PowerPC® processor that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650 may include, but is not limited to, code, applications, protocols, interfaces, and processes for controlling one or more systems within a network including, but not limited to, an adapter, a switch, a server, a cluster system, and a grid environment.

In one embodiment, the operations performed by processor 612 may control the operations of flowchart of FIGS. 7-10 and other operations described herein. Operations performed by processor 612 may be requested by software 650 or other code or the steps of one embodiment of the invention might be performed by specific hardware components that contain hardwired logic for performing the steps, or by any combination of programmed computer components and custom hardware components. In one embodiment, to meet the performance requirements of processor 612, processor 612 may contain hardwired logic comprising switches and buses to perform the operations of flowcharts of FIGS. 7-10.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 618, a random access memory (RAM), such as RAM 614, a read-only memory (ROM) 616, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 600, partly on the user's computer, as a stand-alone software package, partly on the user's computer and partly on a remote computer or entirely on the remote computer or server, such as server 640. In the latter scenario, the remote computer may be connected to the user's computer through any type of network, such as network 602, through a communication interface, such as network interface 632, over a network link that may be connected, for example, to network 602.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 600, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 600, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 632, the network link to network 602, and network 802 may use electrical, electromagnetic, or optical signals that carry digital data streams. The signals through the various networks and the signals on network 602, the network link to network 602, and network interface 632 which carry the digital data to and from computer system 600, may be forms of carrier waves transporting the information.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

Figures 7, 8:
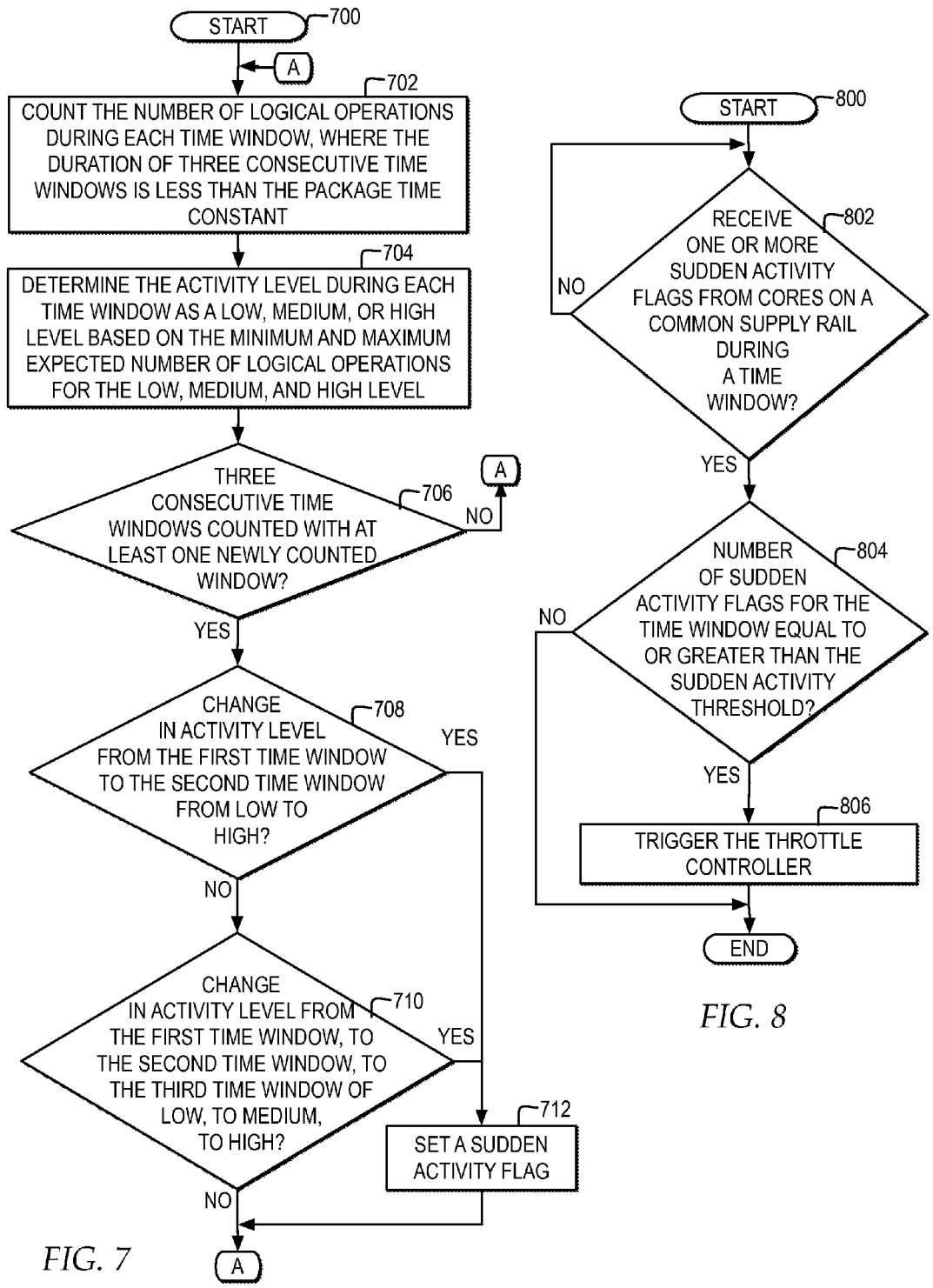
FIG. 7 illustrates a high level logic flowchart of a process and program for monitoring each processor core for sudden activity changes in a processor system with multiple cores sharing a common supply rail of at least one power distribution network.
FIG. 8 illustrates a high level logic flowchart of a process and program for responding to sudden activity changes across multiple process cores sharing a common supply rail.

FIG. 7 illustrates a high level logic flowchart of a process and program for monitoring each processor core for sudden activity changes in a processor system with multiple cores sharing a common supply rail of at least one power distribution network. The process starts at block 700 and thereafter proceeds to block 702. Block 702 illustrates counting the number of logical operations during each time window, where the duration of three consecutive time windows is less than a package time constant. Next, block 704 illustrates determining the activity level during each time window as a low, medium, or high level based on the minimum and maximum expected number of logical operations for the low, medium, and high level. Next, block 706 illustrates a determination whether three consecutive time windows are counted with at least one newly counted window. At block 706, if three consecutive time windows are counted with at least one newly counted window. At block 706, if there are not three consecutive time windows counted with at least one newly counted window, then the process returns to block 702. At block 706, if there are three consecutive time windows counted with at least one newly counted window, then the process passes to block 708.

Block 708 illustrates a determination whether there is a change in activity level from the first time window to the second time window from low to high. At block 708, if there is a change in activity level from the first time window to a second time window from low to high, then the process passes to block 712. Block 712 illustrates setting a sudden activity flag and the process returns to block 702. At block 708, if there is not a change in activity level from the first time window to a second time window from low to high, then the process passes to block 710. Block 710 illustrates a determination whether there is a change in activity level from the first time window to the second time window to the third time window of low, to medium, to high. At block 710, if there is a change in activity level from the first time window to the second time window to the third time window of low, to medium, to high, then the process passes to block 712. At block 710, if there is not a change in activity level from the first time window to the second time window to the third time window of low, to medium, to high, then the process returns to block 702.

FIG. 8 illustrates a high level logic flowchart of a process and program for responding to sudden activity changes across multiple process cores sharing a common supply rail. The process starts at block 800 and thereafter proceeds to block 802. Block 802 illustrates a determination whether one or more sudden activity flags are received during a time window from cores on a common supply rail. At block 802, if one or more sudden activity flags are received during a time window from cores on a common supply rail, then the process passes to block 804. Block 804 illustrates a determination whether the number of sudden activity flags for the time window is equal to or greater than a sudden activity threshold. At block 804, if the number of sudden activity flags for the time window is not equal to or greater than a sudden activity threshold, then the process ends. At block 804, if the number of sudden activity flags for the time window is equal to or greater than a sudden activity threshold, then the process passes to block 806. Block 806 illustrates triggering the throttle controller, and the process ends.

Figure 9:
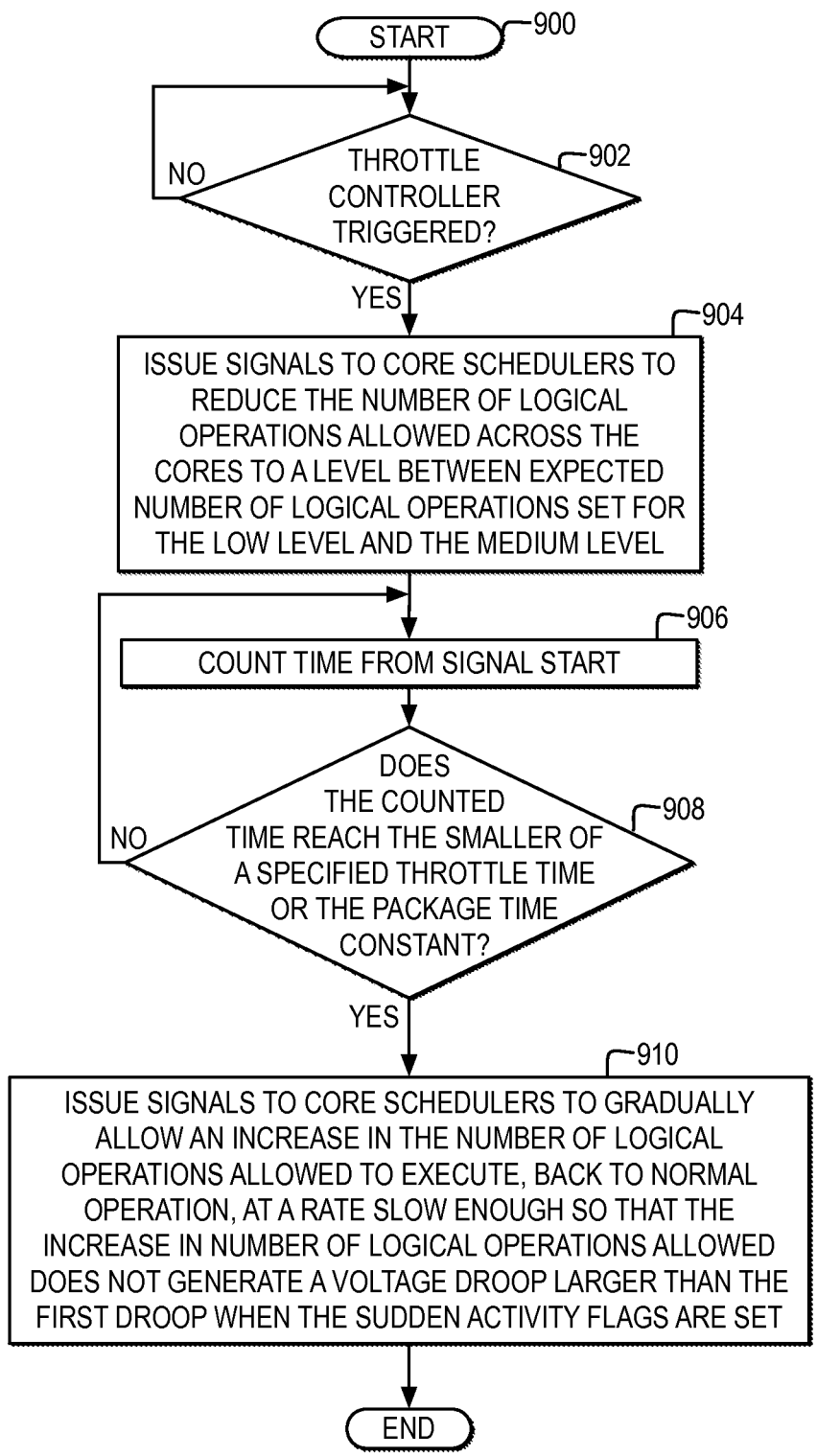
FIG. 9 illustrates a high level logic flowchart of a process and program for managing multiple throttling levels across multiple processor cores sharing a common supply rail in response to detected sudden bursts of activity in at least one of the processor cores.

FIG. 9 illustrates a high level logic flowchart of a process and program for managing multiple throttling levels across multiple processor cores sharing a common supply rail in response to detected sudden bursts of activity in at least one of the processor cores. In the example, the process starts at block 900 and thereafter proceeds to block 902. Block 902 illustrates a determination whether a throttle controller is triggered. If a throttle controller is triggered, then the process passes to block 904. Block 904 illustrates issuing signals to the core schedulers of the processor cores sharing a common supply rail to reduce the number of logical operations allowed to execute in each processor core to a level between the expected number of logical operations set for the low level and medium level. Next, block 906 illustrates counting the time from the start of the signals to the core schedulers. Thereafter, block 908 illustrates a determination whether the counted time reaches the smaller of a specified throttle time or the package time constant. At block 908, if the counted time has not reached the smaller of a specified throttle time or the package time constant, then the process returns to block 906 and continues to count the time for the throttle start. At block 908, if the counted time reaches the smaller of a specified throttle time or the package time constant, then the process passes to block 910. Block 910 illustrates issuing signals to the core schedulers of the processor cores sharing a common supply rail to gradually increase number of logical operations allowed to execute in each processor core back to normal operation, at a rate slow enough so that the increase in number of logical operations allowed does not generate a voltage droop larger than the first droop when the sudden activity flags set, and the process ends.

Figure 10:
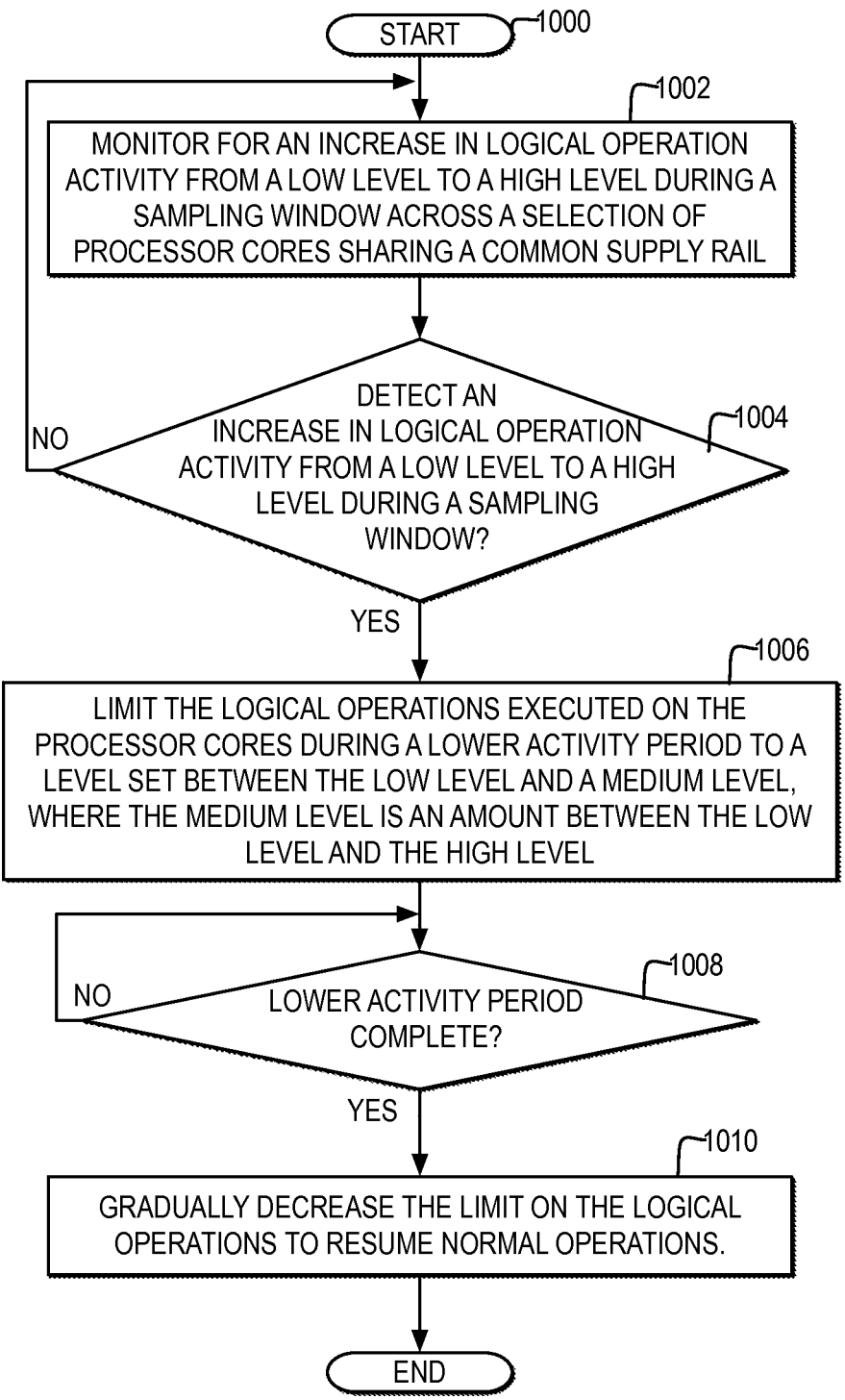
FIG. 10 illustrates a high level logic flowchart of a process and program for performing three power grid noise reduction stages for reducing power grid noise in a processor system in which multiple processor cores share a common rail, while minimizing performance losses.

FIG. 10 illustrates a high level logic flowchart of a process and program for performing three power grid noise reduction stages for reducing power grid noise in a processor system in which multiple processor cores share a common rail, while minimizing performance losses. In the example, the process starts at block 1000 and thereafter proceeds to block 1002. Block 1002 illustrates monitoring for an increase in logical operation activity from a low level to a high level during a sampling window across a selection of processor cores sharing a common supply rail. Next, block 1004 illustrates a determination whether an increase in logical operation activity from a low level to a high level is detected during a sampling window. At block 1004, if no increase in logical operation activity from a low level to a high level is detected during a sampling window, the process returns to block 1002. At block 1004, if an increase in logical operation activity from a low level to a high level is detected during a sampling window, then the process passes to block 1006. Block 1006 illustrates limiting the logical operations executed on the processor cores during a lower activity period to a level set between the low level and a medium level, where the medium level is an amount between the low level and the high level. Next, block 1008 illustrates a determination whether a lower activity period is complete. If a lower activity period is complete, then the process passes to block 1010. Block 1010 illustrates gradually decreasing the limit on the logical operations to resume normal operations, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for managing a processor, comprising:
monitoring, by a processor, for an increase in logical operation activity from a low level to a high level during a sampling window across a plurality of cores sharing a common supply rail of the processor;
responsive to the processor detecting the increase in logical operation activity from the low level to the high level during the sampling window, limiting, by the processor, the logical operations executed on the plurality of cores during a lower activity period to a level of logical operations set between the low level and a medium level, where the medium level is an amount between the low level and the high level; and
responsive to the lower activity period ending, gradually decreasing, by the processor, the limit on the logical operations executed on the plurality of cores to resume normal operations.

2. The method of claim 1, wherein monitoring, by a processor, for an increase in logical operation activity from a low level to a high level during a sampling window across a plurality of cores sharing a common supply rail of the processor, wherein the processor comprises at least one decoupling capacitor along the common supply rail, further comprises:
monitoring, by the processor, for the increase in logical operation activity across at least one switching circuit from among a plurality of switching circuits of the processor, wherein each of the plurality of cores comprises a separate selection of the plurality of switching circuits.

3. The method of claim 1, wherein monitoring, by a processor, for an increase in logical operation activity from a low level to a high level during a sampling window across a plurality of cores sharing a common supply rail of the processor, wherein the processor comprises at least one decoupling capacitor along the common supply rail, further comprises:

counting, by each of the plurality of processor cores, a number of logical operations of the logical operation activity over three consecutive time windows during the sampling window;

comparing a counted number of logical operations for each of the three consecutive time windows with expected levels specifying activity levels of logical operations of the low level, the medium level, and the high level;

responsive to detecting a first time window of the three consecutive time windows set to the low level and a second time window of the three consecutive time windows set to the high level, setting a sudden activity flag;

responsive to detecting the first time window set to the low level, the second time window set to the medium level, and a third time window of the three consecutive time windows set the high level, setting the sudden activity flag; and responsive to detecting the sudden activity flag set, detecting the increase in activity from the low level to the high level during the sampling window.

4. The method of claim 1, wherein monitoring, by a processor, for an increase in logical operation activity from a low level to a high level during a sampling window across a plurality of cores sharing a common supply rail of the processor, wherein the processor comprises at least one decoupling capacitor along the common supply rail, further comprises:

counting, by each of the plurality of processor cores, a number of logical operations of the logical operation activity over three consecutive time windows during the sampling window;

comparing, by each of the plurality of processor cores, a counted number of logical operations for each of the three consecutive time windows with expected levels specifying activity levels of logical operations of the low level, the medium level, and the high level;

responsive to detecting, for each separate processor core of the plurality of processor cores, within a particular core of the plurality of processor cores, at least one of a first time window of the three consecutive time windows set to the low level and a second time window of the three consecutive time windows set to the high level or the first time window set to the low level, the second time window set to the medium level, and a third time window of the three consecutive time windows set to the high level, setting a sudden activity flag for the particular processor core;

responsive to detecting a number of sudden activity flags set by a number of the plurality of processor cores meeting a threshold, detecting the increase in activity from the low level to the high level during the sampling window.

5. The method of claim 1, wherein monitoring, by a processor, for an increase in logical operation activity from a low level to a high level during a sampling window across a plurality of cores sharing a common supply rail of the processor, wherein the processor comprises at least one decoupling capacitor along the common supply rail, further comprises:

monitoring for the increase in logical operation activity during the sampling window, wherein the sampling window is set to a time period shorter than a package time constant, wherein the package time constant is proportional to the square root of an inductance from the plurality of switching circuits at a chip level of the processor to a package level of the processor multiplied by the capacitance of the plurality of switching circuits on the common supply rail at the chip level of the processor.

6. The method of claim 1, wherein responsive to detecting the increase in logical operation activity from the low level to the high level during the sampling window, limiting the logical operations executed on the plurality of cores during a lower activity period to a level of logical operations set between the low level and a medium level, where the medium level is an amount between the low level and the high level, further comprises:

limiting the logical operations executed on the plurality of cores during the lower activity period, wherein the lower activity period is set to a time period shorter than a package time constant, wherein the package time constant is proportional to the square root of an inductance from the plurality of switching circuits at a chip level of the processor to a package level of the processor multiplied by the capacitance of the plurality of switching circuits on the common supply rail at the chip level of the processor.

7. The method of claim 1, further comprising:

detecting the increase in activity on the threshold selection of the plurality of switching circuits by detecting a threshold number of cores of the plurality of cores indicating the selection of switching circuits of each of the threshold number of cores increasing in activity during the sampling window.

8. The method of claim 1, wherein responsive to the lower activity period ending, gradually decreasing the limit on the logical operations executed on the plurality of cores to resume normal operations, further comprises:

decreasing the limit on the logical operations from a level of activity on the plurality of switching circuits from a medium level of activity to a high level of activity, wherein during the lower activity period, the limit on the logical operations is set to the level of activity above the low level of activity and below the medium level of activity.

9. The method of claim 1, wherein monitoring, by a processor, for an increase in logical operation activity from a low level to a high level during a sampling window across a plurality of cores sharing a common supply rail of the processor further comprises:

monitoring, by the processor, for the increase in logical operation activity from the low level to the high level on the processor comprising a plurality of circuits along the common supply rail, wherein the plurality of circuits comprise at least one decoupling capacitor, wherein a voltage droop is triggered in proportion to a change in current increase caused by switching on the plurality of switching circuits multiplied by the square root of an inductance from the plurality of switching circuits on a chip level of the processor to a package level of the processor divided by a capacitance of the plurality of switching circuits.

* * * * *